Figure 1:
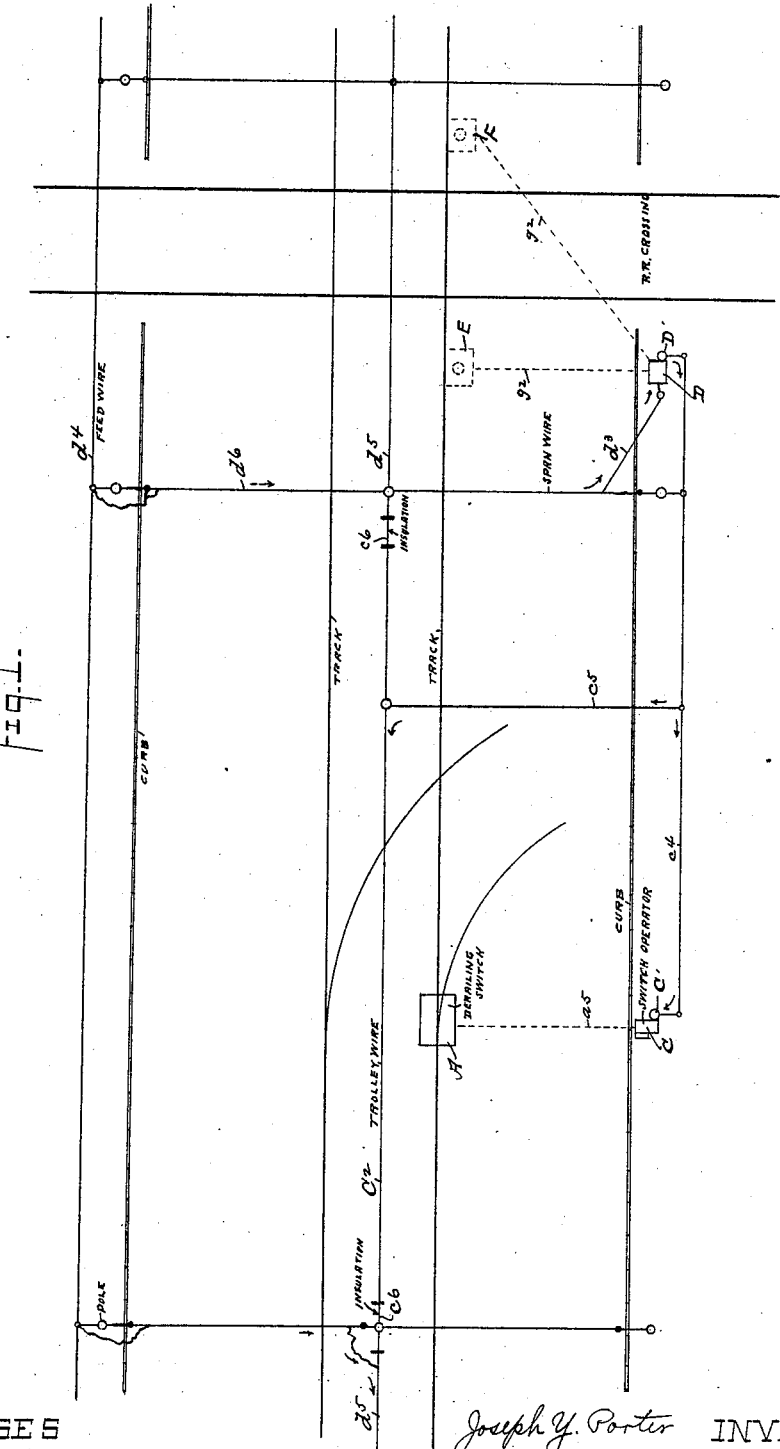

(No Model.) 2 Sheets—Sheet 2.
J. Y. PORTER.
ELECTRIC TRACK SWITCH.
No. 539,299. Patented May 14, 1895.
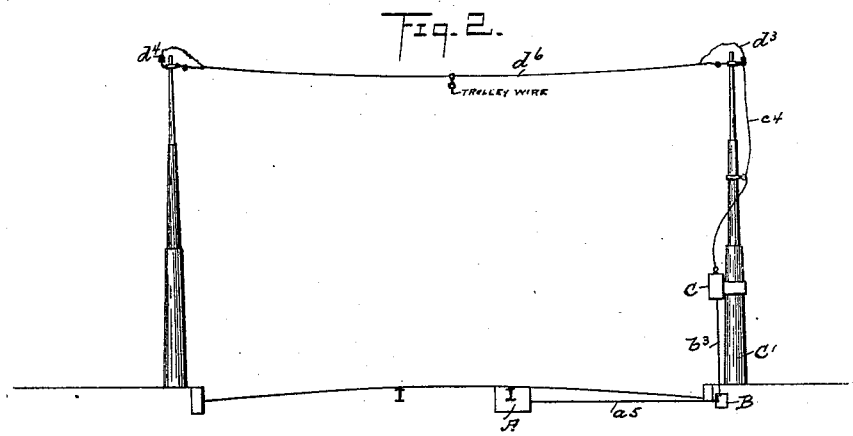
Fig. 2.
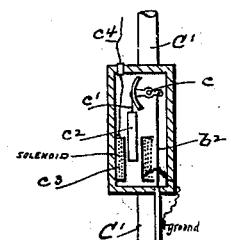
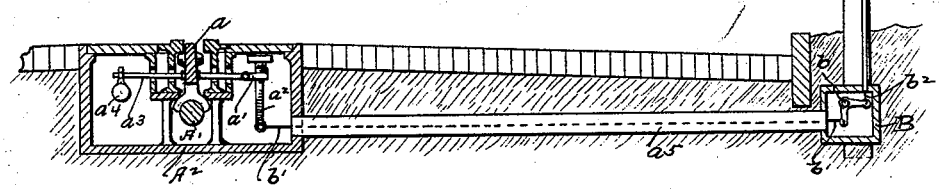
Fig. 3.
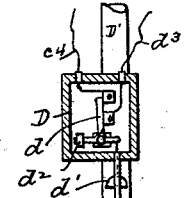
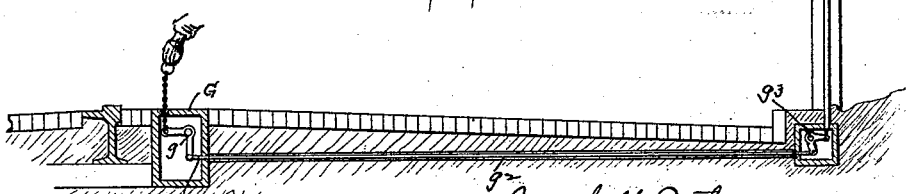
Fig. 4.
WITNESSES
Belle S. Lowrie
Alfred J. Symes Jr
Joseph Y. Porter INVENTOR.
By N. S. Amstutz ATTORNEY

UNITED STATES PATENT OFFICE.

JOSEPH Y. PORTER, OF CLEVELAND, OHIO, ASSIGNOR TO J. W. MORRISON, OF DETROIT, MICHIGAN.

ELECTRIC TRACK-SWITCH.

SPECIFICATION forming part of Letters Patent No. 539,299, dated May 14, 1895.

Application filed February 14, 1894. Serial No. 500,166. (No model.)

*To all whom it may concern:*

Be it known that I, JOSEPH Y. PORTER, a citizen of the United States, residing at Cleveland, in the county of Cuyahoga and State of Ohio, have invented certain new and useful Improvements in Electric Track-Switches; and I do hereby declare the following to be a full, clear, and exact description of the invention, such as will enable others skilled in the art to which it appertains to make and use the same.

My invention relates to improvements in track switches, and it consists of such features as are hereinafter described and especially referred to in the claims hereto annexed.

The invention is designed to insure the safe operation of street railroads or railways.

The switch, in my system, may be normally maintained in an open position, so that the car would be shunted if it passed over the portion of the track where the switch was located while it remained open, and thus prevent a collision with the passing car or cars in a direction across its own track.

I am aware that there have heretofore been used in steam railroad practice derailing switches of various kinds, but I am not aware of there ever having been used or invented a surface track switch which embodies my features of an ordinary and derailing switch as herein set forth.

My switch has safety features in its construction, and the system under which it operates, which substantially make it improbable that distressing and appalling surface railroad-crossing accidents will ever happen with my device, for the reason that the conductor of each car is obliged to walk forward, while the car stops, some distance in safety, and observe whether he has the right-of-way or not, and on determining this matter he must from this position make certain connections which move the track switch and maintain the same in position while the car is passing over the switch, and upon his releasing the connections the switch is again automatically, or otherwise, moved, so as to guard against any subsequent cars being subjected to the probability of serious accidents, if the switch was not normally maintained in such position as to shunt the car from danger.

In connection with my track switch, I also use a trolley circuit breaker, which deprives the motor car of current for a certain distance adjacent to the switch. This section of trolley-wire cannot receive any current until the conductor has made the connections at the railroad-crossing already described, when the trolley will receive its supply of current, but as soon as the car has passed over the track switch, and as the conductor releases the handle which he has been operating, the switch instantly moves into its usual position, and at the same time the section of the trolley-wire referred to is thrown out of circuit with the feed-wire; or in other words, this part of the trolley-wire is made "dead." I may also place in circuit with the switch devices one or more electric lamps if desired. Of course, it is also obvious that I might make suitable track connections upon the intersecting railroad which would automatically make it impossible to close the track switch when used for derailing purposes, and also deprive the car or cars, which are to be protected, of current during the time that the intersecting railroad train was passing over the car tracks. The details of connections, &c., would be substantially as shown with but slight modifications, which do not in any sense depart from the spirit of my invention as herein embodied.

With these ends in view the accompanying drawings illustrate as an instance of the adaptation of the principles involved in my device the following views, of which—

Figure 1 is a diagrammatic plan view of the arrangement of the several features of my device. Fig. 2 is an end elevation of the same. Fig. 3 is an enlarged cross-section of the details of the operating mechanism. Fig. 4 is also an enlarged view of the circuit-controlling device and the means for operating the same.

I provide a switch A, which in this instance is shown as being of the rocker type, but it should be understood that I do not limit myself to the application of my operating device to this style of switch. In this instance I attach my operating mechanism to the tongue $a$ of the switch by means of a rod and connecting link $a'$, which in turn may be operated by a lever $a^2$ this lever being fulcrumed at any suitable point, for instance as shown. Upon the other side of the switch, point $a$, I place an arm $a^3$ which has a counterweight $a^4$, which serves to normally keep the switch in an open position. The rocker or tongue $a$ has bearing upon the shaft $A'$. All of the several parts just referred to are inclosed in a suitable box $A^2$ which has removable covers thereon and is connected in any suitable manner to a system of drainage. From the box there is a pipe $a^5$ which leads to a bell crank box B located just inside of the curb, wherein is placed a bell crank $b$, which has pivoted to the one arm thereof a rod $b'$ which leads to the switch arm $a^2$ through the pipe $a^5$. From the other arm of the bell crank a rod or cable $b^2$ passes through a second pipe $b^3$. This connection is secured to a pivoted arm $c$ located in magnet box C which is attached in any suitable manner to an adjoining pole or support $C'$. The lever $c$ terminates at one end thereof in a crescent shape to which is attached a cable $c'$ which has suspended therefrom a core $c^2$ which is operated upon by the electro-magnet or electro-motor $c^3$. This magnet is of the well known solenoid variety, but I do not in any manner limit myself to the specific electrical means for operating the switch tongue $a$ as herein shown. From the magnet $c^3$ one terminal is led to ground, and the other terminal $c^4$ is led to the controlling box D which is secured to a suitable pole or support $D'$ adjoining the railroad track. This box contains any suitable electric switch which breaks the continuity of the circuit at this point. This switch $d$ may be operated by a handle $d'$ located directly at the box, which handle may be arranged to effect the closing of the switch by pulling thereon, or by pushing, whichever may be desired. A counterweight $d^2$ is provided which normally keeps the switch open. If it is desired to station the conductor at points E and F, as shown in Fig. 1, or at any other points that might be desired, a lever box G may be placed flush with the street, and a chain, or any suitable operating device for moving the bell crank $g$, placed within access of the conductor. The bell crank $g$ connects by cable or rod $g'$ through a pipe $g^2$ to a bell crank $g^3$ located at or near the curb. From this point the rod or cable may pass up to the electric switch box and be connected thereto if such were thought desirable, thus enabling the conductor to control the track-switch as well as the current for the trolley from whatever point or points the boxes G may be located. The circuit, as it enters the electric switch box, is designated as $d^3$, and it passes thereinto by connection with the feed-wire $d^4$, or the trolley-wire $d^5$ through the uninsulated span wire $d^6$. The circuit connection to the section of the trolley-wire adjacent to the track switch which is insulated from the main trolley-wire on either side of it, is led from the wire $c^4$ by any suitable connection $c^5$ to the insulated trolley section $C^2$ which is insulated approximately at points $c^6$ or wherever desired.

From the circuit connections, as outlined, it will be seen that the electric switch D controls the source of current supply to the magnet $c^3$ as well as the trolley section $C^2$. Of course, it is well understood that I could supply the trolley section $C^2$ after having supplied the magnet $c^3$, providing the insulation $c^6$ was placed a sufficient distance on either side of the switch A so that the trolley car would be in position between these points before reaching the switch, and a path would be provided for the current through the car to the ground. With this alternative circuit connection, the current would come from the feed wire, $d^4$, pass over the span wire $d^6$, the short connection $d^3$, to the switch or circuit controller D, thence by wire $c^4$ to the magnet $c^3$ and from there to the insulated section of trolley wire $C^2$, from where it would be conducted over the trolley wheel and pole to the car and thence to the ground, the car and magnet being placed in series, while with the connection previously described the car and magnet were in parallel connection. It is well understood that the size of wire on the magnet would be different with the series than with the parallel connections, since the flow of current in a series connection through the magnet $c^3$ must be sufficient for the car, as well as the magnet. Hence its resistance would likely be considerably less than when placed in parallel, for the reason that under this connection the current necessary for the car does not pass through the magnet, a smaller current being sufficient for the magnet, and its resistance must be higher, but these varying adaptations of connections do not limit me to their specific form. It can also be seen, very readily, how that as soon as the electric switch in the box D is closed, that with the connection as above, the current will have a path through the wire $c^4$, magnet $c^3$ to ground, and also from wire $c^5$, trolley section $C^2$ and through the car to the ground.

Of course, the electric magnet $c^3$ could, undoubtedly, be located directly within the switch box $A^2$, and in view of this possibility I herewith refer to this alternative adaptation of my principles as being embodied within the spirit of my invention, as well as any substantial equivalent adaptation of levers, &c., for operating the switch A and the electric switch $d$, the aim being to utilize any means which enable me to electrically control one or more track switches, or the like, from a point or points located some distance therefrom, as well as trolley sections adjacent such switches wherever desired, whether the current first passes through the electro-magnet, then through the circuit controller and to ground, or is grounded beyond the magnetic device as herein described.

All the circuit connections incident to adapt my device to a double trolley system are obviously adaptations within the scope of my invention, as well as the operation of my devices from sources of current not associated with electric railways.

What I claim is—

1. A track switch, electro-magnetic means for operating the same, an insulated section of trolley wire adjacent said switch and extending some distance on each side thereof, and circuit connections to a source of current supply, from said section of trolley wire and said magnet, whereby both may be supplied with current simultaneously, substantially as set forth.

2. A track switch, electro-magnetic means for operating the same, and insulated section of trolley wire adjacent said switch and extending one or more car lengths, or less on each side of said switch and means for making an electric circuit operative, such means being thereby adapted to simultaneously control said electro-magnetic device and said insulated section of trolley wire, substantially as set forth.

3. A track switch, electro-magnetic means for operating the same, an insulated section of trolley-wire adjacent to said switch, a circuit closing device located some distance from said switch and adapted to simultaneously control said electro-magnet and said insulated section of trolley-wire, either furnishing the same with a current or depriving the said section of trolley-wire and the said magnet from having any current, substantially as set forth.

4. A track switch, electro magnetic means for operating the same, an insulated section of trolley wire adjacent said switch, and circuit connections to a source of current supply, from said section of trolley wire and said magnet, whereby both may be supplied with current simultaneously substantially as set forth.

In testimony whereof I affix my signature in presence of two witnesses.

JOSEPH Y. PORTER.

Witnesses:
  N. S. AMSTUTZ,
  GEO. H. SCHWAN.